3,148,112
STEROID HORMONE COMPOSITIONS AND
METHOD OF EMPLOYING SAME
Robert G. Zimbelman, Kalamazoo, Mich., assignor to The
Upjohn Company, Kalamazoo, Mich., a corporation of
Delaware
No Drawing. Filed Oct. 16, 1961, Ser. No. 145,437
7 Claims. (Cl. 167—53)

This invention relates to pharmaceutical compositions and more particularly to pharmaceutical compositions containing a progestational steroid and an androgen. It relates also to methods of treating ovulating animals and birds.

The present invention provides pharmaceutical compositions comprising 6α-methyl-17α-hydroxyprogesterone 17-acetate and an androgen. The invention provides also methods of treating ovulating animals and birds.

The 6α-methyl-17α-hydroxyprogesterone 17-acetate is prepared in accordance with the methods disclosed in co-pending application Serial No. 685,391.

The term androgen is used in the art-recognized sense and refers to natural and synthetic substances capable of inducing masculinizing characteristics; for example, androsterone, testosterone, 17-methyl-testosterone, fluoxymesterone, norethandrolone, stanolone, testosterone cyclopentylpropionate, testosterone enanthate, testosterone propionate, ethinyl testosterone, and the like.

As used in the specification and claims of this application, oral pharmaceutical carrier refers to solid oral carriers, as used in capsules, pills, pilules, and tablets; and liquid oral carriers, as used in elixirs, solutions, suspensions, and syrups. The term injectable pharmaceutical carrier refers to water for injection, sterile aqueous solutions, sterile vegetable oils, sterile vegetable oil solutions, and the like. The term implantable pharmaceutical carrier refers to nontoxic diluents, bulking agents and the like, suited for implantation, as of a pellet. The term animal feed carrier refers to feed and the like, as used for livestock, dogs and cats. The term bird feed carrier refers to feed, mash and the like, as used for chickens and turkeys. Pre-mixes are ingestible mixes suited for addition to the basic rations of the birds and animals.

It is especially advantageous to formulate the inventive composition in solid and liquid dosage unit forms for ease and economy of administration and uniformity of dosage. Dosage unit form as used in the specification and claims herein refers to physically discrete units suitable as unitary dosages for animal and bird subjects, each unit containing a predetermined quantity of active material calculated to produce the desired therapeutic effect in association with the required pharmaceutical carrier. The specifications for the novel dosage unit forms of this invention are dictated by and directly dependent on (a) the unique characteristics of the active materials and the particular therapeutic effect to be achieved and (b) the limitations inherent in the art of compounding such active materials for therapeutic use in animal and bird subjects as disclosed in detail in this specification, these being features of the present invention. Examples of the dosage unit forms heretofore described are a pellet, a tablet, a capsule, a pill, a powder packet, a wafer and a cachet; a dropperful, a teaspoonful, and a tablespoonful; an ampul and a vial; segregated multiples thereof; and other forms alluded to herein. In accordance with the specific type of the final composition, the therapeutically active ingredients are compounded with the appropriate carrier. In the case of a solid dosage unit form, the said carriers comprise disintegrators, lubricants, diluents, binders, flavors and the like. In the case of a liquid dosage unit form, the said carriers comprise water, edible oils, alcohol, glycols, suspending agents, surfactants, preservatives, and the like. In the case of an injectable dosage unit form, the carriers comprise water, glycols, ethanol, vegetable oils, preservatives, bactericidal and bacteriostatic agents, suspending agents, surfactants, isotonic agents, and the like. The animal and bird feed carriers comprise in balanced amounts the essential dietary constituents protein, fat, carbohydrate, minerals, and the like. Pre-mixes contain ingestible bulking agents or diluents, which can be dietary constituents, and the active ingredients in a concentration suited for addition to animal and bird rations in amounts calculated from the weight of the animal or bird under treatment.

The inventive compositions are administered in varying dosages depending on the weight and condition of the animals and birds under treatment, the route of administration, the particular condition to be treated, and the nature of the desired results. The total daily dosage of each active ingredient per pound of the treated subject varies from about 0.04 to about 0.8 milligram. Thus, over the weight range of about 5.5 pounds for a heavy breed hen to about 1000 pounds for a mare, the daily dosages range from about 0.22 milligram to about 800 milligrams of each active ingredient.

The said dosages can be administered, for example; in the form of an ingestible pre-mix containing by weight from about 1 to about 2% of the 6α-methyl-17α-hydroxyprogesterone 17-acetate and from about 1 to about 2% of the androgen; in the form of a sterile injectable suspension containing by weight from about 1 to about 25% of the 6α-methyl-17α-hydroxyprogesterone 17-acetate and from about 1 to about 25% of the androgen; in the form of an implantable pellet containing from about 10 to about 500 milligrams of the 6α-methyl-17α-hydroxyprogesterone 17-acetate and from about 10 to about 500 milligrams of the androgen; in the form of an ingestible bolus containing from about 50 to about 200 milligrams of the 6α-methyl-17α-hydroxyprogesterone 17-acetate and from about 50 to about 200 milligrams of the androgen; in the form of an aqueous oral suspension containing by weight from about 0.3 to about 0.9% of the 6α-methyl-17α-hydroxyprogesterone 17-acetate and from about 0.3 to about 0.9% of the androgen; in the form of an ingestible bird feed composition containing by weight from about 0.0001 to about 0.0015% of the 6α-methyl-17α-hydroxyprogesterone 17-acetate and from about 0.0001 to about 0.0015% of the androgen; and in the form of an oral tablet containing from about 1 to about 10 milligrams of the 6α-methyl-17α-hydroxyprogesterone 17-acetate and from about 1 to about 10 milligrams of the androgen.

The compositions of the present invention are novel and useful preparations possessing unexpected, nonobvious, beneficial properties, for example, by synchronization of ovulation in the absence or presence of estrus in members of a group of swine, cattle, horses, sheep, dogs, or cats, by preventing estrual activity particularly in fattening meal animals, and by providing compositions and methods to further weight gain with lessened side effects in beef cattle. Unexpectedly low amounts of the progestational steroid are active in the combination. In birds there are provided compositions and methods to control the moulting period and egg laying period of a flock and to increase the number of eggs. The species variations in the estrual periods of the ovulating animals must be taken into account in the several uses of the inventive compositions. When cycling, cows, sheep, swine, and cats have normal estrual periods from about 15 to about 23 days apart; dogs about six months apart. Thus, the oral or injectable treatment to synchronize ovulation is continued for a maximum number of days ascertainable by reference to the normal length of the estrual period of the particular species. Prolonged prevention of the estrual periods is brought about by continued oral treatment or spaced administration of injectable suspensions with a prolonged effect.

The following examples illustrate the best mode contemplated by the inventor of carrying out the invention and are not to be construed as limiting.

*Example 1.—Injectable Suspension*

10,000 mils. of a sterile aqueous suspension are prepared from the following types and amounts of ingredients:

| Each ml.: | Total |
|---|---|
| 50 mgs. 6α-methyl-17α-hydroxyprogesterone 17-acetate _____gms__ | 500 |
| 50 mgs. testosterone cyclopentylproprionate _____gms__ | 500 |
| 9 mgs. sodium chloride _____gms__ | 90 |
| 0.2 mg. preservative _____gms__ | 2 |
| Q.s. water for injection U.S.P. ad. ___mls__ | 10,000 |

The sodium chloride and preservative are dissolved in the water and the whole is sterilized by passage through a sterilizing filter. The active ingredients are micronized, sterilized by exposure to sterilizing vapor and added aseptically to the sterile aqueous solution. Dispersion is accomplished by passing through a sterile homogenizer. The final suspension is filled aseptically into sterile vials. The duration of action of the injected suspension is prolonged.

The single injection of 4 mls. per animal in a group of beef cattle is effective in preventing estrus for from about 50 to about 100 days.

*Example 2.—Oral Suspension*

4000 mls. of a fluid drop preparation suitable for the addition of measured amounts to animal feed is prepared from the following types and amounts of ingredients:

| | |
|---|---|
| Preservative _____gms__ | 14 |
| Surfactant _____gms__ | 3.6 |
| 6α - methyl - 17α - hydroxyprogesterone 17 - acetate _____gms__ | 25 |
| Ethinyl testosterone _____gms__ | 25 |
| Purified water U.S.P., q.s. ad. _____mls__ | 4000 |

The preservative is added to 500 mls. of the water at about 55° C. The surfactant is added followed by the micronized active ingredients. The whole is made up to volume with the balance of the water and passed through an homogenizer.

For the control of the estrual period of a 10 kilo bitch, 2 ml. is added daily to the animal ration, providing a daily dosage of 12.50 mgs. of the steroid acetate equivalent to 1.25 mgs. per kilo of dog weight per day and 12.50 mgs. of the androgen equivalent to 1.25 mgs. per kilo of dog weight per day. After cessation of treatment, the animal comes into heat and can be bred successfully.

For the synchronization of the moulting period in poultry, 8 mls. are mixed daily into 50 lbs. of feed mash for a flock of 100 heavy breed (5.5 lbs.) hen chickens, providing a daily dosage in one-half pound of the mash of 0.5 mg. of the steroid acetate equivalent to 0.2 mg. per kilo of hen weight per day and 0.5 mg. of the androgen equivalent to 0.2 mg. per kilo of hen weight per day. After cessation of treatment the chickens begin to lay concurrently.

*Example 3.—Bird Feed Composition*

A mash feed mix for hen chickens is prepared from the following types and amounts of materials:

| | |
|---|---|
| Laying mash _____lbs__ | 100 |
| 6α - methyl - 17α - hydroxyprogesterone 17 - acetate _____mgs__ | 100 |
| Fluoxymesterone _____mgs__ | 100 |

The active ingredients are worked into a portion of the mash by careful mixing, and the mix is incorporated uniformly into the remaining mash by milling. Each pound of the finished preparation contains 1 mg. of the steroid acetate and 1 mg. of the androgen, providing a daily dose of 0.5 mg. and 0.5 mg. respectively for a heavy breed hen eating one-half pound of the mash per day. This daily dose is effective in controlling the moulting period.

*Example 4.—Implantable Composition*

1000 pellets for implantation in beef cattle are prepared from the following types and amounts of materials:

| | Gms. |
|---|---|
| 6α-methyl-17α-hydroxyprogesterone 17-acetate | 200 |
| Testosterone enanthate | 200 |

The active ingredients are blended with an inert diluent into a uniform mixture. The mixture is slugged and screened to a granular consistency. The granules are compressed into pellets, each containing 200 mgs. of the progestational compound and 200 mgs. of the androgen.

Good results in the weight increase of growing beef cattle are obtained by implantation of one pellet at the time the cattle go on full feed for fattening.

*Example 5.—Pre-Mix*

10,000 gms. of a pre-mix is prepared from the following types and amounts of ingredients:

| | |
|---|---|
| 6α - methyl - 17α - hydroxyprogesterone 17 - acetate _____gms__ | 150 |
| 17-methyltestosterone _____gms__ | 150 |
| Soybean meal _____gms__ | 9700 |
| Chloroform, U.S.P. _____mls__ | 1500 |

A chloroform solution of the active ingredients is prepared and incorporated gradually and uniformly into the soybean meal. After adequate mixing the whole is dried to remove any trace of chloroform.

Each gram of the pre-mix contains 15 mgs. of the steroid acetate and 15 mgs. of the androgen. The pre-mix is added to the standard ration of a group of gilts to provide a daily dose to each gilt of 0.4 mg. of the steroid acetate and 0.4 mg. of the androgen per pound of gilt weight. Treatment for a maximum of 21 days prevents estrus. Thereafter the gilts come concurrently into estrus for breeding purposes.

An equally satisfactory pre-mix is prepared by omitting the chloroform, grinding the active ingredients to a fine powder, and using mineral oil as an antidust to facilitate the preparation of a uniform pre-mix which is well suited for later incorporation into the animal ration.

*Example 6*

Following the compounding procedure of Example 5, a pre-mix is prepared to contain, per gram, 15 mgs. of 6α-methyl-17α-hydroxyprogesterone 17-acetate and 15 mgs. of methyltestosterone. 900 gms. of the pre-mix is added to 598 lbs. of heifer basic ration.

A random group of seven heifers was placed on this ration for a period of 20 days. The group received 14 pounds of the ration twice daily equivalent to 4 pounds per head per day. Thus, the treatment provided a daily dosage of 90 mgs. each of the steroid acetate and of the methyltestosterone. No ovarian abnormalities were found by rectal palpation. The estrual periods of 6 of the 7 heifers occurred within a 24-hour period after the cessation of the treatment. Conception occurred at first service in 3 of the 7.

*Example 7.—Bolus*

9000 boluses, each containing 90 mgs. of the steroid acetate and 90 mgs. of the androgen, are prepared from the following types and amounts of ingredients:

| | Gms. |
|---|---|
| 6α-methyl-17α-hydroxyprogesterone 17-acetate | 810 |
| Methyltestosterone | 810 |
| Lactose | 58,320 |

The above ingredients are blended and granulated with syrup-starch paste, and q.s. mineral oil is added. The granulation is then dried, lubricated with starch, talc and calcium stearate powders, and compressed.

The oral administration to a cycling mare of four boluses per day is effective in the control of estrus. The treatment is especially advantageous in racing mares.

*Example 8.—Oral Tablets*

10,000 compressed tablets are prepared from the following types and amounts of ingredients:

Each tablet:
| | Gms. |
|---|---|
| 1.25 mgs. 6α-methyl-17α-hydroxyprogesterone 17-acetate | 12.5 |
| 1.25 mgs. fluoxymesterone | 12.5 |
| 150 mgs. lactose | 1500 |
| 3 mgs. acacia | 30 |
| 65 mgs. starch, bolted | 650 |
| 3 mgs. calcium stearate | 30 |

The first four ingredients are powdered and mixed well. The mixture is granulated with syrup-starch paste and dried. The dried granules are well mixed with the starch-calcium stearate lubricant mixture. The whole is compressed in to tablets.

Good results are obtained in the prevention of the estrual period in smaller dogs weighing about 5 lbs., one tablet being administered daily.

What is claimed is:

1. A pharmaceutical composition comprising 6α-methyl-17α-hydroxyprogesterone 17-acetate, an androgen and a pharmaceutical carrier.

2. A solid pharmaceutical composition comprising from about 1 to about 500 mgs. of 6α-methyl-17α-hydroxyprogesterone 17-acetate, from about 1 to about 500 mgs. of an androgen and a solid oral pharmaceutical carrier.

3. An ingestible pre-mix comprising by weight from about 1 to 2 percent of 6α-methyl-17α-hydroxyprogesterone 17-acetate, from about 1 to about 2 percent of an androgen and an animal feed carrier.

4. A liquid pharmaceutical composition comprising by weight from about 0.3 to about 25 percent of 6α-methyl-17α-hydroxyprogesterone 17-acetate, from about 0.3 to about 25 percent of an androgen, and a liquid pharmaceutical carrier.

5. A method of treatment which comprises systemically administering 6α-methyl-17α-hydroxyprogesterone 17-acetate and an androgen to ovulating animals and birds to produce progestational effects therein.

6. The method of claim 5 characterized in that the animals are treated as a group.

7. The method of claim 5 characterized in that the birds are treated as a flock.

References Cited in the file of this patent

UNITED STATES PATENTS 2,965,541    Byrnes _____ Dec. 20, 1960

OTHER REFERENCES

Barnes: Proc. Soc. Exptl. Biol. and Med., vol. 100, April 1959, pages 820–822.